United States Patent

Yamamoto et al.

[11] Patent Number: 5,515,208
[45] Date of Patent: May 7, 1996

[54] ENDOSCOPE OBJECTIVE LENS

[75] Inventors: Chikara Yamamoto; Ryota Ogawa, both of Tokyo, Japan

[73] Assignee: Asahi Kogaku Kogyo Kabushiki Kaisha, Tokyo, Japan

[21] Appl. No.: 266,882

[22] Filed: Jul. 5, 1994

[30] Foreign Application Priority Data

Jul. 6, 1993 [JP] Japan ................................ 5-166696
May 24, 1994 [JP] Japan ................................ 6-109432

[51] Int. Cl.$^6$ .................................................. G02B 9/00
[52] U.S. Cl. ................................................... 359/740
[58] Field of Search ........................................ 359/740

[56] References Cited

U.S. PATENT DOCUMENTS

| | | | |
|---|---|---|---|
| 2,671,380 | 3/1954 | Baker | 359/740 |
| 2,720,140 | 10/1955 | Lange | 359/740 |
| 4,674,844 | 6/1987 | Nishioka et al. | 359/740 |
| 4,979,808 | 12/1990 | Yamagata et al. | 359/740 |
| 5,071,235 | 12/1991 | Mori et al. | 359/740 |
| 5,087,988 | 2/1992 | Nakayama | 359/740 |
| 5,119,238 | 6/1992 | Igarashi | 359/740 |
| 5,296,971 | 3/1994 | Mori | 359/740 |

FOREIGN PATENT DOCUMENTS

| | | | |
|---|---|---|---|
| 0188511 | 8/1986 | Japan | 359/740 |
| 0200316 | 8/1989 | Japan | 359/740 |
| 405107471 | 4/1993 | Japan | 359/740 |
| 405134171 | 5/1993 | Japan | 359/740 |
| 1670662 | 8/1991 | U.S.S.R. | 359/740 |

*Primary Examiner*—Georgia Y. Epps
*Assistant Examiner*—Evelyn A. Lester
*Attorney, Agent, or Firm*—Sandler, Greenblum & Bernstein

[57] ABSTRACT

An endoscope objective lens having a first lens group of negative power, a diaphragm, a second lens group of positive power consisting of first and second lenses, and a third lens group of positive power consisting of a positive lens cemented to a negative lens. The first lens group, diaphragm, first and second lenses of the second lens group, and positive and negative lenses of the third lens group are arranged in this order from an object side. A lens surface on the image side of the first lens has a radius of curvature ri which satisfies the relationship "$-0.25 \leq 1/ri < 0$".

14 Claims, 5 Drawing Sheets

ENDOSCOPE OBJECTIVE LENS

BACKGROUND OF THE INVENTION

1. Field of the Invention

The present invention relates to an objective lens for use in an endoscope wherein a transverse chromatic aberration is corrected.

2. Description of Related Art

An endoscopic objective lens is provided at the front end of an endoscope together with an illuminating optical system, and air or water supply channels. Accordingly, the diameter and length of the objective lens for an endoscope must be as small as possible.

A conventional objective lens for an endoscope is usually comprised of three lens groups consisting of four lenses. For example, an objective lens may consist of a first lens group having a single negative lens, a diaphragm, a second lens group having a single positive lens, and a negative third lens group having a cemented positive lens consisting of a positive lens and a negative lens adhered thereto, as viewed from the object side.

However, in conventional endoscopic objective lenses having three lens groups consisting of four lenses, achromatization is carried out only by the cemented positive lens adjacent to an image to be taken. Consequently, chromatic difference in magnification (or transverse chromatic aberration) will not be satisfactorily compensated.

The chromatic difference of magnification in the endoscopic objective lens should be as small as possible depending on the diameter of an optical fiber incorporated in the endoscope. If the chromatic difference of magnification fails to be sufficiently eliminated, an image (i.e., color) to be transmitted is dimmed particularly at the peripheral portion thereof, thus resulting in deteriorated image quality. This might lead to a misdiagnosis.

In general, the diameter of an optical fiber used in an endoscope was approximately 10 μm, but recent progress in manufacturing technology has made it possible to produce optical fibers having smaller diameters and higher resolving power as an image guide. To respond to this, the chromatic difference of magnification of the objective lens for an endoscope must be restricted as much as possible so as to provide high contrast and resolving power to thereby obtain a high quality image.

The primary object of the present invention is to provide a compact objective lens for an endoscope in which a chromatic difference of magnification can be sufficiently eliminated without the need for substantial modification of an existing objective lens system.

SUMMARY OF THE INVENTION

To achieve the object mentioned above, according to an aspect of the present invention, an endoscope objective lens is provided having a first lens group of negative power, a diaphragm, a second lens group of positive power consisting of first and second lenses, and a third lens group of positive power consisting of a positive lens cemented to a negative lens. The first lens group, diaphragm, first and second lenses of the second lens group, and positive and negative lenses of the third lens group are arranged in this order from an object side. A lens surface on the image side of the first lens has a radius of curvature $ri$ which satisfies the relationship "$-0.25 \leq 1/ri < 0$".

Preferably, the Abbe's number $v2$ of the first lens of the second lens group on the object side is smaller than the Abbe's number $v3$ of the second lens of the second lens group (i.e., $v2<v3$).

It is of greater preference that the following relationship exists;

$$v2-v3 \leq -15$$

In an embodiment, the Abbe's numbers $vp$ and $vn$ of the positive and negative lenses of the third lens group satisfy the following relationship;

$$vp-vn>25$$

The first lens group can be a single lens.

The first lens group can be provided with a flat lens surface on the object side.

The second lens group can be a cemented lens.

Preferably, the first lens of the second lens group is a plano-convex lens having a planar surface facing the object side.

According to another aspect of the present invention, an endoscope objective lens is provided, including a first lens group of negative power, a diaphragm, a second lens group of positive power, and a third lens group having a positive power, arranged in this order from an object side. The second lens group consists of a plano-convex lens having a planar surface facing the object side and a positive meniscus lens adhered to the plano-convex lens and having a convex surface facing the image side.

According to still another aspect of the present invention, an endoscope objective lens is provided, including a first lens group made of a single lens of negative power, a diaphragm, a second lens group of positive power and consisting of a first optical element and a second optical element, and a third lens group of positive power and consisting of a positive lens cemented to a negative lens. The first lens group, the diaphragm, the first and second optical elements of the second lens group, and the positive and negative lenses of the third lens group are arranged in this order from an object side. The first and second optical elements are made of glass materials having different Abbe's numbers satisfying the relationship "$v2<v3$", $v2$ designating the Abbe's number of the first optical element and $v3$ designating the Abbe's number of the second optical element. A lens surface on the image side of the first optical element has a radius of curvature $ri$ that satisfies the relationship "$-0.25 \leq 1/ri<0$".

The first optical element is brought into close contact with or cemented to the second optical element.

The present disclosure relates to subject matter contained in Japanese patent application No. 05-166696 (filed on Jul. 6, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
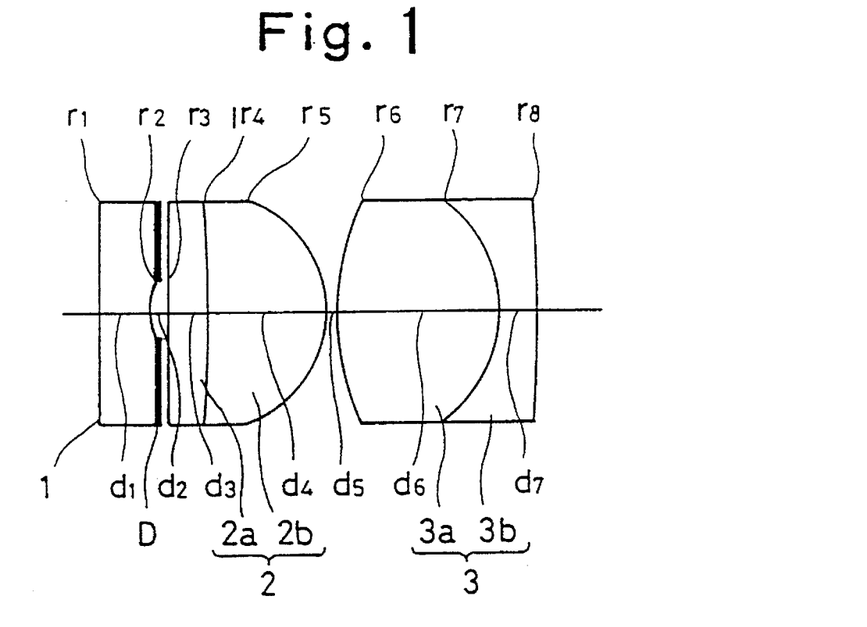
FIG. 1 is a schematic view of a lens arrangement of an endoscopic objective lens according to a first embodiment of the present invention.

In the illustrated embodiments, an objective lens for an endoscope is comprised of a first lens group 1 made of a single negative plano-concave lens, a diaphragm D, a second lens group 2 including a cemented lens consisting of a plano-convex lens (i.e., first optical element) 2a whose convex surface is located adjacent to an object to be photographed and a positive meniscus lens (i.e., second optical element) 2b adhered thereto whose convex surface is located adjacent to the object, and a third lens group 3 including a cemented lens consisting of a double convex lens 3a and a negative meniscus lens 3b adhered thereto, as can be seen for example in FIG. 1. These elements are located in this order from the object side (i.e., left side in the drawings).

The objective lens forms an object image on an end face of a bundle of optical fibers (not shown) located on the right side in FIG. 1.

The objective lens has a large angle of view, i.e., receives a quantity of incident light. Accordingly, off-axis light incident upon the diaphragm D and emitted from the diaphragm as divergent light is made incident upon the positive lens directly behind the diaphragm at a large incident angle. However, the correction effect of the transverse chromatic aberration at the incident surface (i.e., refracting surface) of the positive lens can be enhanced, since the incident surface of the positive lens is made of a flat plane.

In general, in an endoscopic objective lens, the positive lens located directly behind the diaphragm has a relatively large thickness to make light incident upon the end face of a bundle of optical fibers at right angles or angles as close thereto as possible. When the light is made incident upon the end face of the bundle of optical fibers at right angles, the loss of light is minimum. The quantity of light incident upon the end face of the bundle of optical fibers decreases as the incident angle with respect to a line normal to the end face increases.

Consequently, the thickness of the positive lens is closely related to the utilization efficiency of light and must be large enough to ensure that the height of light transmitted through the second lens group and made incident upon the last lens is identical to or approximates the height of the light corresponding to the diameter of the bundle of optical fibers. Namely, the thickness of the positive lens located immediately behind the diaphragm is large enough to provide a sufficient height of off-axis light.

As can be understood from the foregoing, since the second positive lens group immediately after the diaphragm has a relatively large thickness, the second positive lens group can be split into two. In the present invention, the resultant thickness of the split lenses is substantially identical to the thickness of the conventional positive lens immediately behind the diaphragm in an endoscopic objective lens, so that the chromatic difference of magnification can be eliminated without sacrificing the compactness of the endoscopic objective lens, this being one of the most significant features of the present invention.

The second positive lens group 2 immediately after the diaphragm is comprised of first and second optical elements 2a and 2b having different ν values. The refracting surface of the second positive lens group 2 functions to correct the chromatic difference of magnification.

Preferably, the second optical element 2b of the second positive lens group 2 has a refractive index identical to or larger than 1.7 to obtain a sufficient thickness at the peripheral edge portion thereof and is made of glass that disperses little light so as not to increase the chromatic aberration caused in the first negative lens group 1 located closer to the object than the diaphragm.

In the lens arrangement of the conventional endoscopic objective lens, only the third lens group located on the image side serves as an achromatizing element, whereas in the present invention, both the second and third lens groups 2 and 3 function to achromatize the chromatic aberration. Thus, the chromatic difference of magnification of the whole optical system can be effectively eliminated or reduced in the present invention.

In the present invention, to correct the chromatic difference of magnification, the Abbe's number ν2 of the first optical element 2a of the second lens group 2 is preferably smaller than the Abbe's number ν3 of the second optical element 2b of the second lens group 2 (ν2<ν3). It is of greater preference that ν2−ν3 is less than or equal to −15 to further enhance the achromatizing effect.

If ν2 is larger than ν3 (ν2>ν3), the chromatic difference of magnification occurs in the second positive lens group. If ν2=ν3, the second lens group in the present invention is quite the same as that in the conventional objective lens. Namely, the two split optical elements 2a and 2b are equivalent to the conventional single second lens group. Even if the relationship defined by "ν2−ν3≦−15" does not exist, the achromatizing effect can be expected to some extent, but a sufficient achromatizing effect will not result.

The radius of curvature ri of the second surface of the first optical element 2a on the image side satisfies the relationship defined by −0.25≦1/ri<0. The first optical element of the second lens group is made of a plano-convex lens whose convex surface faces the image side. The second optical element of the second lens group is made of a meniscus lens which makes it possible to increase the thickness of the second optical element at the peripheral edge thereof, in comparison with a plano-convex lens. Consequently, all the lenses of the first through third lens groups can be identical in outer diameter. Owing to the identical outer diameter of the lenses, they can be easily and successively fitted in a cylindrical lens barrel having a corresponding inner diameter, thus leading to an easy assembly.

If the value of 1/ri is smaller than −0.25, the achromatizing effect is reduced to an amount equivalent to that of a conventional second lens group which is made of a single lens.

If the radius of curvature of the second surface of the first optical element of the second lens group on the image side is a negative value, the curvature of the second surface of the second optical element can be reduced, so that a secondary effect, in which under correction of the spherical aberration is restricted, can be obtained.

The third lens group is made of a cemented lens consisting of a positive lens and a negative lens adhered thereto. The Abbe's number νp of the positive lens is larger than the Abbe's number νn of the negative lens (i.e., νp>νn) so as to effectively correct the chromatic aberration.

It is necessary to increase the thickness of the third lens group at the peripheral edge thereof to thereby easily machine the same. To this end, the curvature of the connecting surface of the cemented lens is preferably small to reduce the power of the positive lens. Moreover, to make it possible to correct the chromatic aberration, even when the positive lens has a reduced power, the positive lens and the negative lens are made of glass materials in combination having a difference in dispersibility, large enough to satisfy (vp–vn>25).

First Embodiment

FIG. 1 shows a first embodiment of a lens arrangement of an endoscopic objective lens according to the present invention.

Numerical data of the lens system shown in FIG. 1 is shown in Table 1 below. In Table 1, "m" designates the magnification; "fB" the back-focal distance; "MC" the maximum value of the chromatic difference of magnification between C-line and g-line; "r" the radius of curvature of each lens surface; "d" the lens thickness or the distance between the lenses, "n" the refractive index of each lens at d-line (588 nm); and, "ν" the Abbe's number of each lens, respectively.

Figure 2:
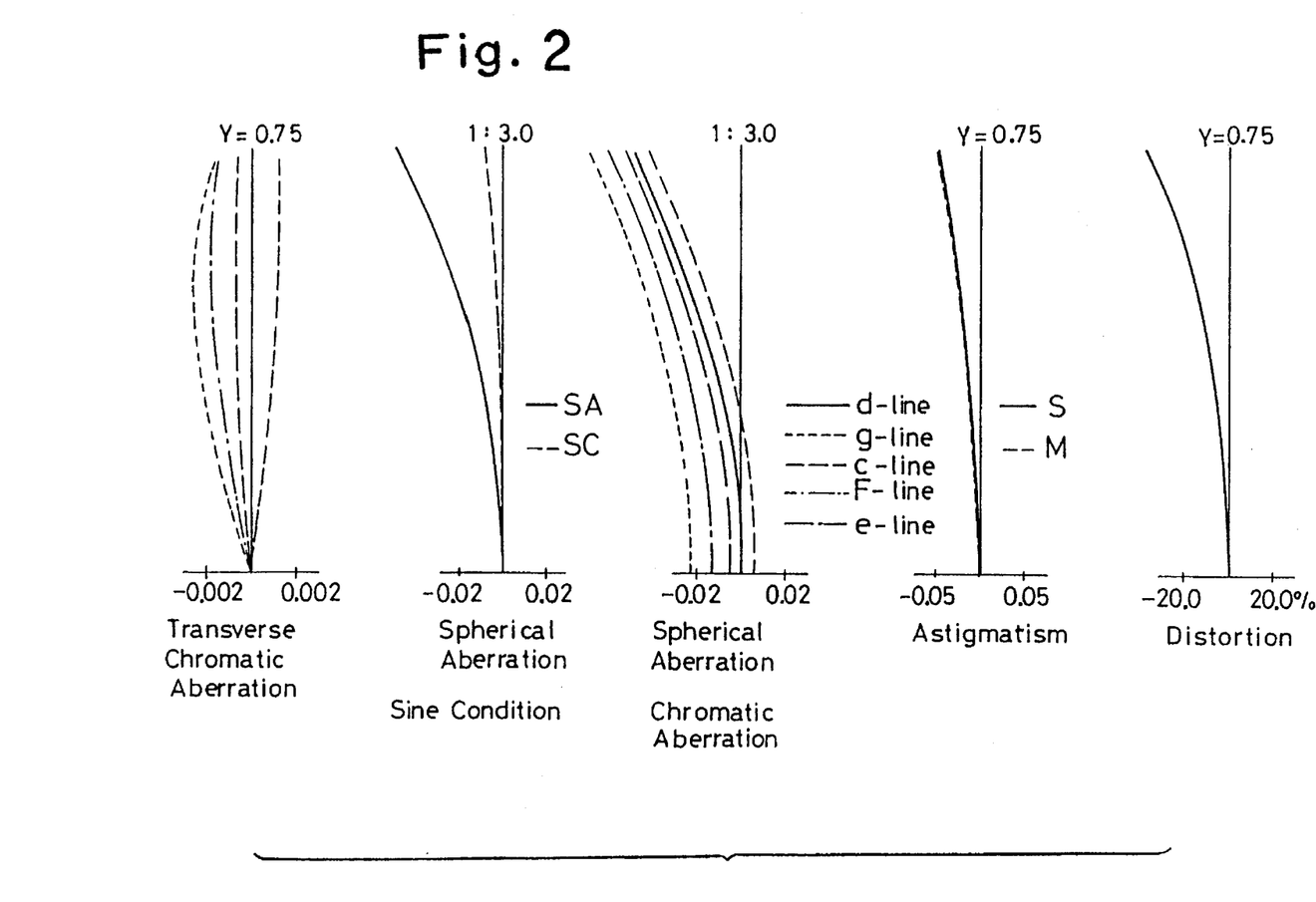
FIG. 2 shows diagrams of various aberrations in an endoscopic objective lens shown in FIG. 1.

FIG. 2 shows diagrams of the transverse chromatic aberration at the d-line, g-line, C-line, F-line, and e-line; the spherical aberration SA; the sine condition SC; the chromatic aberration represented by the spherical aberration at the d-line, g-line, C-line, F-line, and e-line; the astigmatism (S: Sagittal ray, M: Meridional ray); and the distortion.

TABLE 1 m = −0.1662
fB = 0.572
MC = 3.8 μm

| Surface No. | r | d | N | ν |
|---|---|---|---|---|
| 1 | ∞ | 0.45 | 1.51633 | 64.1 |
| 2 | 0.676 | 0.07 | | |
| 3 | ∞ | 0.30 | 1.84666 | 23.9 |
| 4 | −10.000 | 0.84 | 1.72916 | 54.7 |
| 5 | −0.824 | 0.05 | | |
| 6 | 1.877 | 1.20 | 1.72916 | 54.7 |
| 7 | −0.950 | 0.30 | 1.84666 | 23.9 |
| 8 | −10.794 | | | |

Second Embodiment

Figure 3:
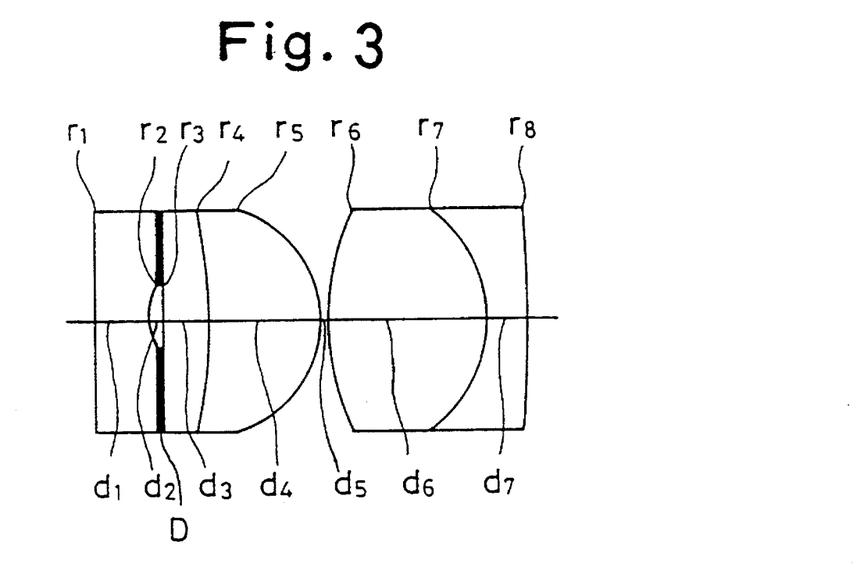
FIG. 3 is a schematic view of a lens arrangement of an endoscopic objective lens according to a second embodiment of the present invention.

FIG. 3 shows a lens arrangement of an endoscopic objective lens according to a second embodiment of the present invention. In this arrangement, the diaphragm D is provided between the second and third lens surfaces.

Figure 4:
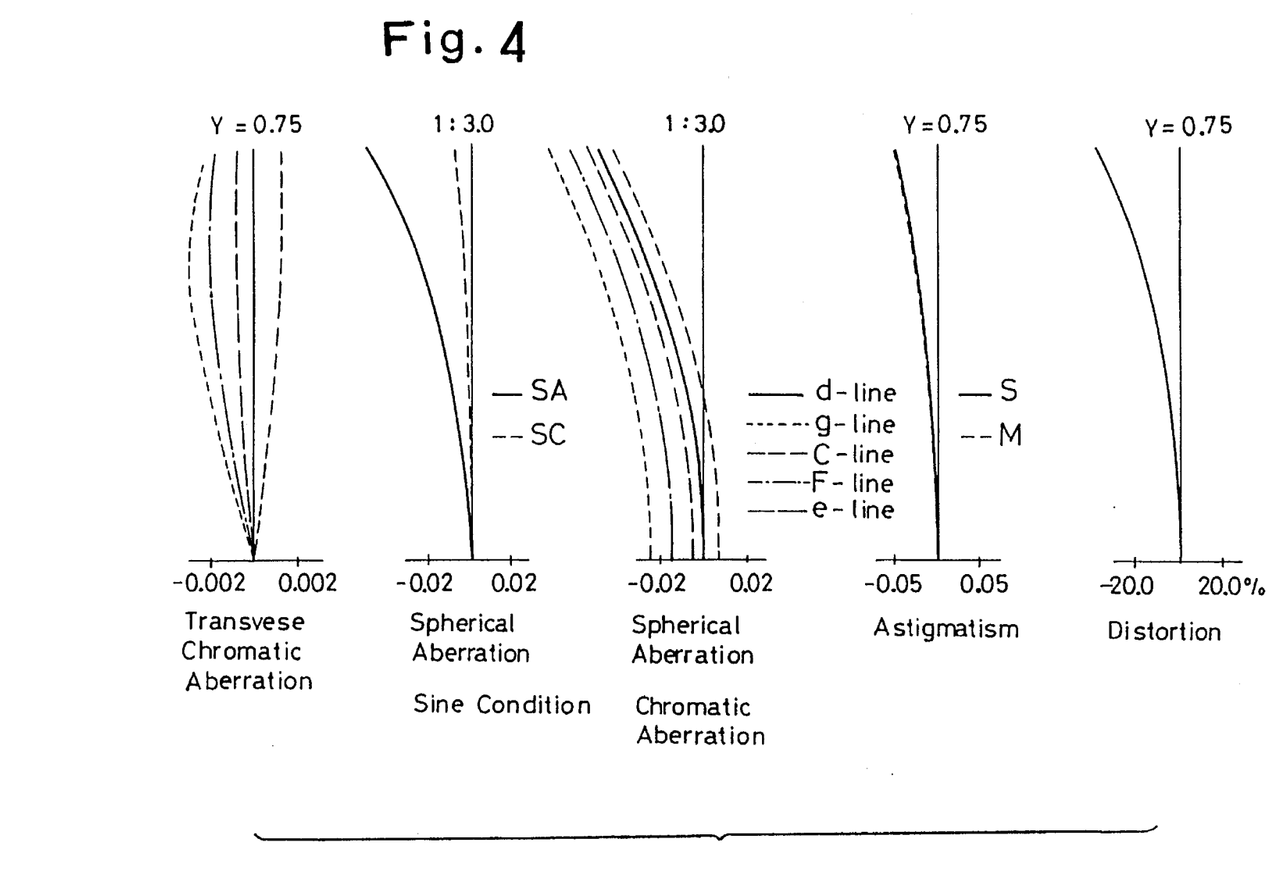
FIG. 4 shows diagrams of various aberrations in an endoscopic objective lens shown in FIG. 3.

Numerical data of the lens system shown in FIG. 3 is shown in Table 2 below. Diagrams of various aberrations thereof are shown in FIG. 4.

TABLE 2 m = −0.1657
fB = 0.563
MC = 4.1 μm

| Surface No. | r | d | N | ν |
|---|---|---|---|---|
| 1 | ∞ | 0.45 | 1.51633 | 64.1 |
| 2 | 0.676 | 0.07 | | |
| 3 | ∞ | 0.30 | 1.84666 | 23.9 |
| 4 | −6.000 | 0.84 | 1.72916 | 54.7 |
| 5 | −0.824 | 0.05 | | |
| 6 | 1.877 | 1.20 | 1.72916 | 54.7 |
| 7 | −0.950 | 0.30 | 1.84666 | 23.9 |

TABLE 2-continued m = −0.1657
fB = 0.563
MC = 4.1 μm

| Surface No. | r | d | N | ν |
|---|---|---|---|---|
| 8 | −10.794 | | | |

Third Embodiment

Figure 5:
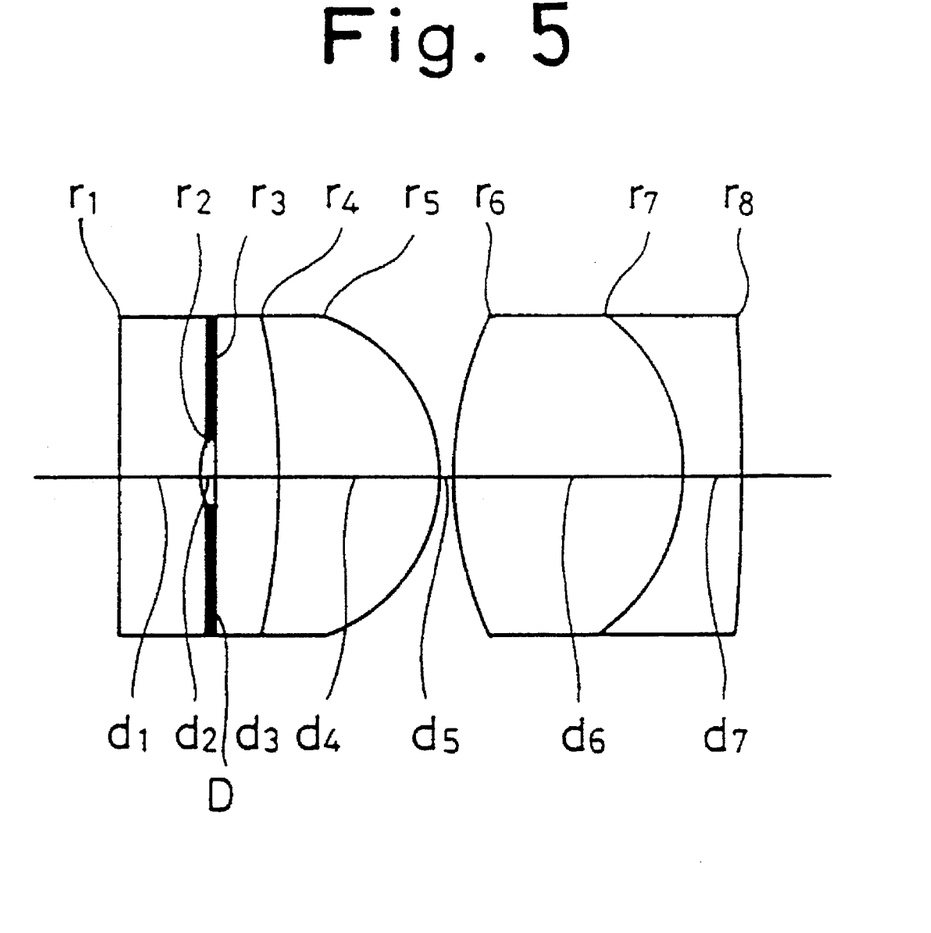
FIG. 5 is a schematic view of a lens arrangement of an endoscopic objective lens according to a third embodiment of the present invention; and, FIG. 6 shows diagrams of various aberrations in an endoscopic objective lens shown in FIG. 5.

FIG. 5 shows a lens arrangement of an endoscopic objective lens according to a third embodiment of the present invention. In this arrangement, the diaphragm D is provided between the second and third lens surfaces.

Figure 6:
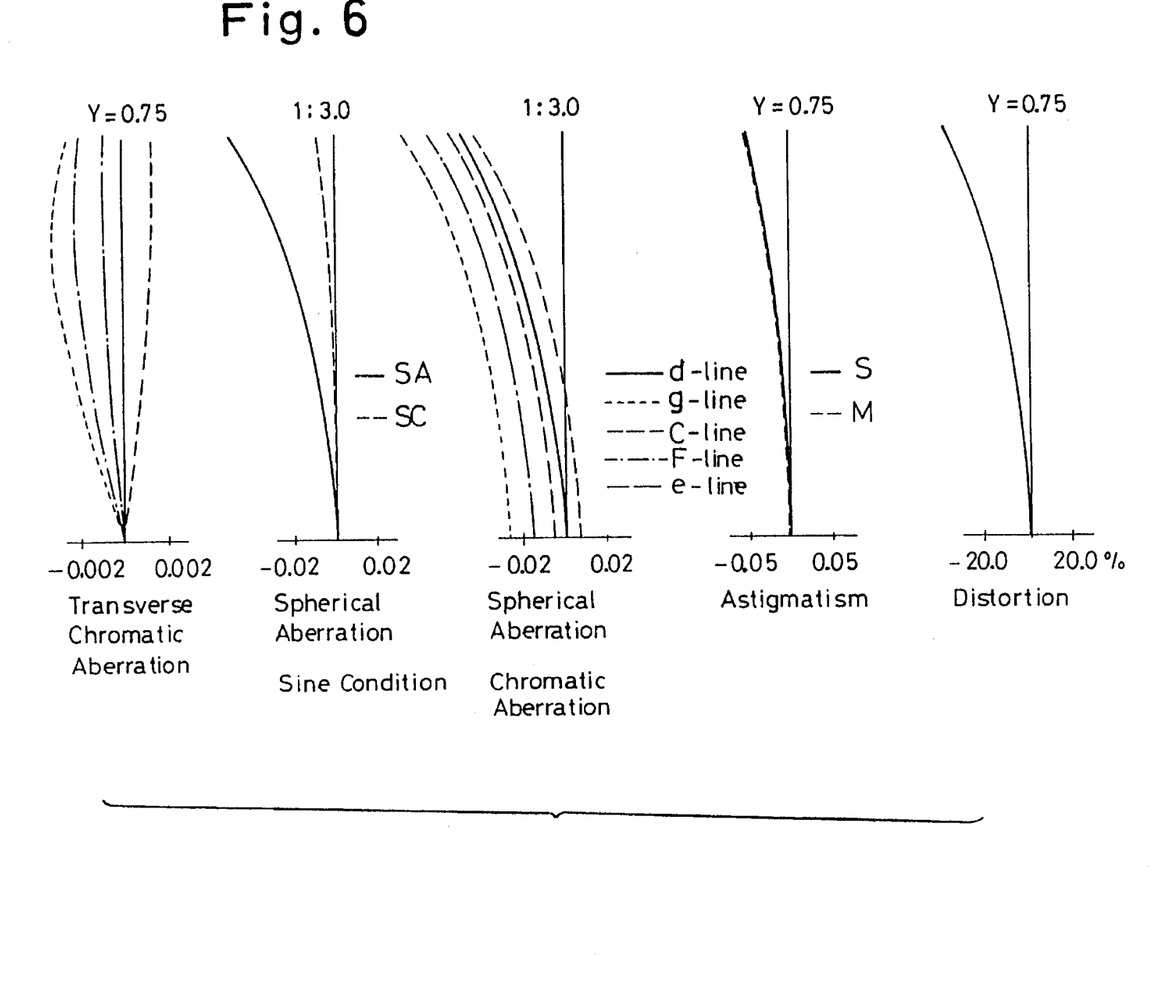

Numerical data of the lens system shown in FIG. 5 is shown in Table 3 below. Diagrams of various aberrations thereof are shown in FIG. 6.

TABLE 3 m = −0.1650
fB = 0.552
MC = 4.5 μm

| Surface No. | r | d | N | ν |
|---|---|---|---|---|
| 1 | ∞ | 0.45 | 1.51633 | 64.1 |
| 2 | 0.676 | 0.07 | | |
| 3 | ∞ | 0.30 | 1.84666 | 23.9 |
| 4 | −4.000 | 0.84 | 1.72916 | 54.7 |
| 5 | −0.824 | 0.05 | | |
| 6 | 1.877 | 1.20 | 1.72916 | 54.7 |
| 7 | −0.950 | 0.30 | 1.84666 | 23.9 |
| 8 | −10.794 | | | |

The radius r4 of curvature of the second surface (on the image side) of the first lens (on the object side) of the second lens group and the reciprocal 1/r4 thereof in the first through third embodiments of the present invention are as follows.

| 1st embodiment: | r4 = −10.000 | 1/r4 = −0.1 |
| 2nd embodiment: | r4 = −6.000 | 1/r4 = −0.167 |
| 3rd embodiment: | r4 = −4.000 | 1/r4 = −0.25 |

These values satisfy the relationship of $(-0.25 \leq 1/ri < 0)$.

The values of ν2 and ν3 of the first and second lenses 2a and 2b of the second lens group 2 in the three embodiments are:

ν2=23.9; ν3=54.7; ν2–ν3=−30.8

Consequently, the value of "ν2–ν3" satisfies the relationship of "ν2–ν3≦−15".

Moreover, the values νp and νn of the positive and negative lenses of the third lens group 3 in the three embodiments are:

νp=54.7; νn=23.9; νp–νn=30.8

This satisfies the relationship "νp–νn>25".

As may be understood from the above discussion, according to the present invention, since the second lens group is split into two lens elements, the chromatic difference of magnification can be effectively corrected while reserving the compactness of the conventional lens system having three lens groups consisting of four lenses, so that an endoscopic objective lens having a high resolving power can be obtained.

We claim:

1. An endoscope objective lens comprising:

a first lens group of negative power;

a diaphragm;

a second lens group of positive power and consisting of first and second lenses; and, a third lens group of positive power and consisting of a positive lens cemented to a negative lens;

wherein said first lens group, said diaphragm, said first and second lenses of said second lens group, and said positive and negative lenses of said third lens group are arranged in this order from an object side to an image side; and, wherein a lens surface on the image side of said first lens has a radius of curvature ri which satisfies the relationship "$-0.25 \leq 1/ri < 0$".

2. The objective lens of claim 1, wherein an Abbe's number ν2 of the first lens of the second lens group is smaller than an Abbe's number ν3 of the second lens of the second lens group.

3. The objective lens of claim 2, wherein the following relationship exists;

$$\nu2-\nu3 \leq -15.$$

4. The objective lens of claim 1, wherein Abbe's numbers νp of the positive lens and νn of the negative lens of the third lens group satisfy the following relationship;

$$\nu p - \nu n > 25.$$

5. The objective lens of claim 1, wherein the first lens group is a single lens.

6. The objective lens of claim 5, wherein the first lens group is provided with a flat lens surface on the object side.

7. The objective lens of claim 2, wherein the second lens group is a cemented lens.

8. The objective lens of claim 2, wherein the first lens of the second lens group is a plano-convex lens having a planar surface facing the object side.

9. An endoscope objective lens comprising:

a first lens group of negative power;

a diaphragm;

a second lens group of positive power; and, a third lens group having a positive power, arranged in this order from an object side to an image side, wherein said second lens group consists of a plano-convex lens having a planar surface facing the object side and a positive meniscus lens adhered to the plano-convex lens and having a convex surface facing the image side.

10. The objective lens of claim 9, wherein the convex surface of the plano-convex lens on the image side has a radius of curvature ri which satisfies the following relationship;

$$-0.25 \leq 1/ri < 0.$$

11. The objective lens of claim 10, wherein the Abbe's number ν2 of the plano-convex lens and the Abbe's number ν3 of the positive meniscus lens satisfy the following relationship;

$$\nu2-\nu3 \leq -15.$$

12. An endoscope objective lens comprising:

a first lens group made of a single lens of negative power;

a diaphragm;

a second lens group of positive power and consisting of a first optical element and a second optical element; and, a third lens group of positive power and consisting of a positive lens cemented to a negative lens;

wherein said first lens group, said diaphragm, said first and second optical elements of said second lens group, and said positive and negative lenses of said third lens group are arranged in this order from an object side to an image side; and, wherein said first and second optical elements are made of glass materials having different Abbe's numbers satisfying the relationship "ν2<ν3", ν2 designating the Abbe's number of the first optical element and ν3 designating the Abbe's number of the second optical element; and, further wherein a lens surface on the image side of said first optical element has a radius of curvature ri that satisfies the relationship "$-0.25 < 1/ri < 0$".

13. The objective lens of claim 12, wherein the first optical element is brought into close contact with the second optical element.

14. The objective lens of claim 12, wherein the first optical element is cemented to the second optical element.

* * * * *

UNITED STATES PATENT AND TRADEMARK OFFICE
CERTIFICATE OF CORRECTION

PATENT NO. : 5,515,208
DATED : May 7, 1996
INVENTOR(S) : C. YAMAMOTO et al.

It is certified that error appears in the above-indentified patent and that said Letters Patent is hereby corrected as shown below:

At column 8, line 41 (claim 12, line 21), change ""-0.25<1/ri<0"" to ---"-0.25≤1/ri<0"---.

Signed and Sealed this

Eleventh Day of February, 1997

BRUCE LEHMAN

*Attest:*

*Attesting Officer*        *Commissioner of Patents and Trademarks*